H. NUTRIZIO.
Coffee-Pot.
No. 207,768. Patented Sept. 3, 1878.
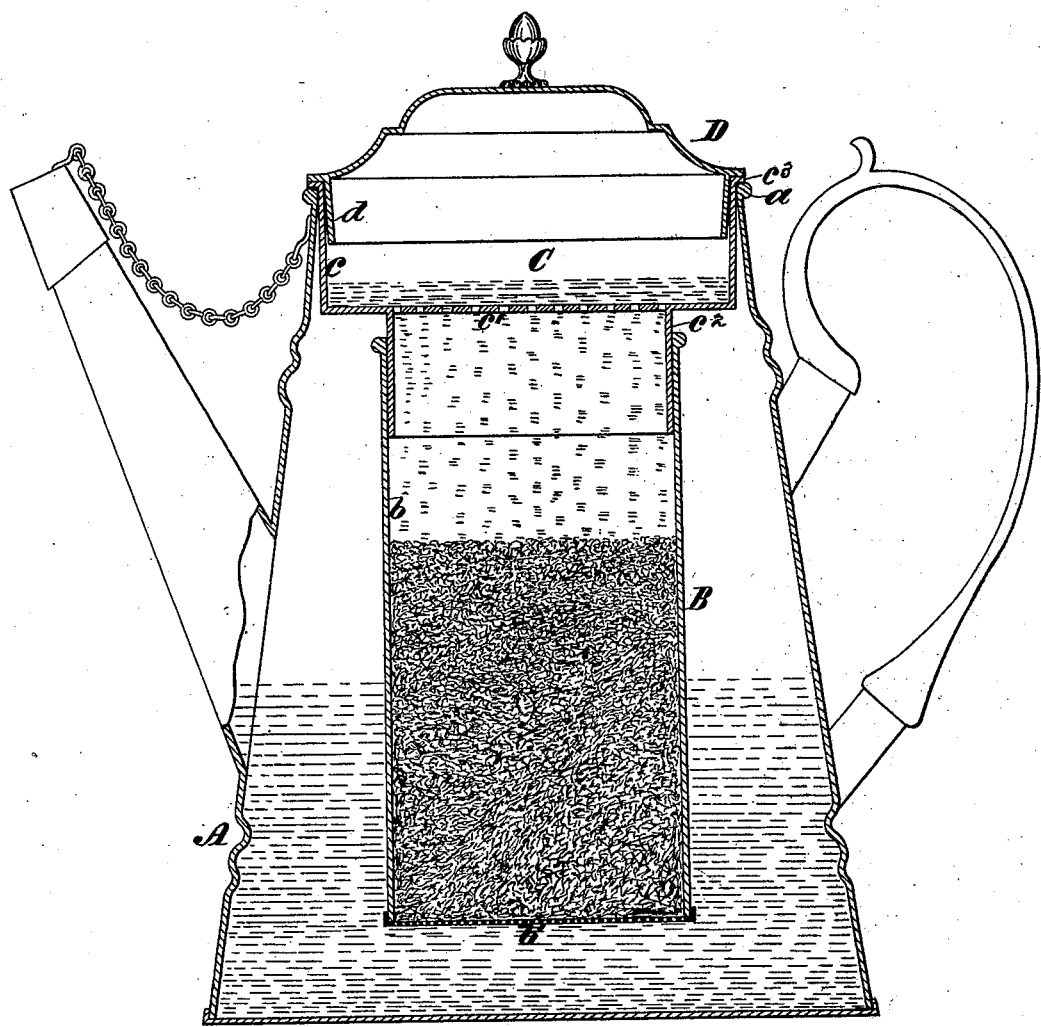
WITNESSES:
Saml. J. VanStavoren
Jos. B. Connolly
INVENTOR,
Henry Nutrizio
By Connolly Bros.,
ATTORNEYS.

UNITED STATES PATENT OFFICE.

HENRY NUTRIZIO, OF PHILADELPHIA, PENNSYLVANIA.

IMPROVEMENT IN COFFEE-POTS.

Specification forming part of Letters Patent No. 207,768, dated September 3, 1878; application filed July 11, 1878.

*To all whom it may concern:*

Be it known that I, HENRY NUTRIZIO, of Philadelphia, in the county of Philadelphia and State of Pennsylvania, have invented certain new and useful Improvements in Coffee-Pots; and I do hereby declare the following to be a full, clear, and exact description of the invention, such as will enable others skilled in the art to which it pertains to make and use it, reference being had to the accompanying drawing, which forms part of this specification, and which represents a vertical central section of my improved coffee-pot.

My invention has for its object to provide a simple, effective, and comparatively inexpensive construction of coffee-pots of that class known as "steamers," wherein the decoction is obtained by pouring boiling water over the ground berries, the latter being suspended in a cylindrical chamber having a foraminated bottom.

My improvements consist in the peculiar construction and combination of parts hereinafter fully set forth.

In making coffee it is well recognized that the boiling water should not be permitted to pass too swiftly through the ground berries, but that its passage should be slow or retarded, in order to effect a thorough extraction of the strength of such berries. It is likewise recognized that to preserve the aroma of the coffee the filtration of the water through the berries should proceed in a closed vessel.

The improved construction of my coffee-pot proceeds upon a recognition of these culinary elemental truths, having also in view the important element of cheapness of manufacture.

In carrying my invention into effect, I construct the coffee-berry chamber in the shape or form of a long slender cylinder, having its upper end open and its lower end closed by a foraminated bottom. This berry-chamber is designed to occupy the position of a pendant within the body of the coffee-pot, being attached to the water-compartment, which is also a cylinder of considerably greater diameter, but of much less depth, than the berry-chamber. Said water-chamber has a perforated bottom, to which is secured a vertical annular flange, over which the open end of the berry-chamber slips, and has also around its upper edge a horizontal annular flange, which rests upon the rim of the body of the coffee-pot. The lid of the coffee-pot forms the top of the water-chamber, entering the open upper end of the latter, fitting therein tightly, so as to produce a joint which will prevent the escape of the aroma from within.

Referring to the accompanying drawing, A designates the body of the coffee pot or steamer. B is the coffee-berry chamber, consisting of a long slender cylinder, $b$, with foraminated bottom $b'$. C is the water-compartment, above the berry-chamber, being a wide but shallow cylinder, $c$, having a perforated bottom, $c^1$, to which is fastened a vertical annular flange, $c^2$, over which the upper open end of the berry-chamber B passes. The walls of the water-compartment C are bent over at their upper edge to form a horizontal annular flange, $c^3$, which rests on the rim $a$ of the coffee-pot, by means of which said compartment and the attached berry-chamber are suspended within the coffee-pot. The diameter of the water-compartment, measuring from the outside of the walls, is equal to the internal diameter of the upper open end of the coffee-pot, so that said compartment must be caused to enter said open end by a moderate amount of pressure, thus forming a tight joint and preventing the escape of the aroma from the decoction within. D is the lid of the coffee-pot, having an annular flange, $d$, which fits snugly inside the walls of the water-compartment, forming a tight joint therewith.

The operation is as follows: The ground coffee is placed in the chamber B, a sufficient amount being taken to fill, or only partly fill, said chamber. The chamber B is then slipped over the flange $c^2$ of the water-compartment, and said chamber and compartment placed within the coffee-pot, the horizontal flange $c^3$ resing on the rim $a$ of said coffee-pot. Boiling water is now poured into the compartment C until the latter is filled, when the lid D is at once applied, the confined water then being permitted to slowly percolate through the ground berries in the chamber B. Owing to the comparatively great depth of said chamber the water will percolate very slowly, and hence by the time it has passed through the berries it will have extracted all the valuable properties of the latter, securing a clear and strong decoction.

I am aware that coffee boilers or steamers having a berry-chamber with superposed water-compartment suspended within the body of the pot are already known and used, such berry-chamber and water-compartment, however, being of the same, or substantially the same, diameter. I do not wish, therefore, to be understood as claiming broadly a berry-chamber with superposed water-compartment in a coffee-pot; but What I do claim is—

1. The combination of the narrow cylindrical chamber B with the water-compartment C, said water-compartment being of considerably greater diameter than the berry-chamber, and having the vertical annular flange $c^2$, for the attachment of the berry-chamber, and the horizontal annular flange $c^3$, for suspension on the rim of the coffee-pot, both the water and berry chambers being suspended within the body of the coffee-pot, substantially as shown and set forth.

2. The combination, with coffee-pot A, of water-compartment C, the exterior diameter of said compartment being equal to the interior diameter of the open upper end of the pot, so as to form a tight joint therewith, the berry-chamber B, of considerably less diameter than said water-compartment, and the lid D, having an annular flange, $d$, fitting snugly into said compartment, both the water and berry chambers being suspended within the body of the coffee-pot, the whole being constructed and arranged for operation substantially as shown, and for the purposes set forth.

In testimony that I claim the foregoing I have hereunto set my hand this 3d day of July, 1878.

HENRY NUTRIZIO.

Witnesses:
SAML. J. VAN STAVOREN,
CHAS. F. VAN HORN.